United States Patent
Pujol et al.

(10) Patent No.: US 7,653,775 B2
(45) Date of Patent: Jan. 26, 2010

(54) ENHANCING PERFORMANCE OF SATA DISK DRIVES IN SAS DOMAINS

(75) Inventors: Matthew John Pujol, Pueblo, CO (US); Luke Everett McKay, Colorado Springs, CO (US)

(73) Assignee: LSI Logic Corporation, Milpitas ( * ) Notice: Subject to any disclaimer, the term of this patent is extended or adjusted under 35 U.S.C. 154(b) by 183 days.

(21) Appl. No.: 11/733,132

(22) Filed: Apr. 9, 2007

(65) Prior Publication Data

US 2008/0250176 A1  Oct. 9, 2008

(51) Int. Cl.
G06F 13/36 (2006.01)
G06F 13/20 (2006.01)
G06F 13/38 (2006.01)
G06F 13/14 (2006.01)

(52) U.S. Cl. .................. 710/315; 710/313; 710/311
(58) Field of Classification Search .................. 710/315
See application file for complete search history.

(56) References Cited

U.S. PATENT DOCUMENTS

| | | | |
|---|---|---|---|
| 5,535,373 A | | 7/1996 | Olnowich |
| 7,024,505 B2 * | | 4/2006 | Thiesfeld .................... 710/120 |
| 7,058,749 B2 * | | 6/2006 | Loffink ........................ 710/313 |
| 7,206,875 B2 * | | 4/2007 | Marushak et al. ............. 710/62 |
| 7,363,395 B2 * | | 4/2008 | Seto ............................ 710/11 |
| 7,496,700 B1 * | | 2/2009 | Chong et al. ................... 710/52 |
| 2004/0081179 A1 * | | 4/2004 | Gregorcyk, Jr. .............. 370/402 |
| 2005/0015532 A1 * | | 1/2005 | Beckett et al. ............... 710/105 |
| 2005/0108452 A1 * | | 5/2005 | Loffink ......................... 710/74 |
| 2005/0149656 A1 * | | 7/2005 | Seto ............................ 710/105 |
| 2005/0216604 A1 | | 9/2005 | Loffink |
| 2006/0095599 A1 | | 5/2006 | Douglas |
| 2006/0230218 A1 * | | 10/2006 | Warren et al. ............... 710/315 |
| 2006/0242312 A1 | | 10/2006 | Crespi |
| 2007/0121621 A1 * | | 5/2007 | Moretti et al. ............... 370/389 |
| 2007/0136521 A1 * | | 6/2007 | Voorhees et al. ............. 711/112 |
| 2007/0206496 A1 * | | 9/2007 | Roy et al. ..................... 370/229 |
| 2007/0220357 A1 * | | 9/2007 | Vedanabhatla et al. ........ 714/43 |
| 2008/0155163 A1 * | | 6/2008 | Stenfort ....................... 710/315 |

FOREIGN PATENT DOCUMENTS

WO   WO 2005066820 A1 *  7/2005

OTHER PUBLICATIONS

Tanenbaum, Andrew S.; "Structured Computer Organization"; Prentice-Hall, Inc.; 1990; Third Edition; pp. 11-13.*
PCT International Search Report and Written Opinion in English for Application No. PCT/US08/59764, mailed Jul. 28, 2008, pp. 1-8.

* cited by examiner

Primary Examiner—Ryan M Stiglic

(57) ABSTRACT

Methods and apparatus to enhance performance of Serial Advanced Technology Attachment (SATA) disk drives in Serial-Attached Small Computer System Interface (SAS) domains are described. In one embodiment, a data packets and/or commands communicated in accordance with SAS protocol may be converted into SATA protocol. Other embodiments are also described.

14 Claims, 4 Drawing Sheets

ENHANCING PERFORMANCE OF SATA DISK DRIVES IN SAS DOMAINS

FIELD

The present description generally relates to electronic devices. More particularly, an embodiment of the invention generally relates to enhancing performance of Serial Advanced Technology Attachment (SATA) disk drives in Serial-Attached Small Computer System Interface (SAS) domains.

BACKGROUND

SAS is becoming more popular in enterprise storage systems. SAS may support SATA disk drives through a tunneling protocol (which may be referred to as SATA Tunneling Protocol (STP)). SATA was, however, not designed for a multi-device implementation. SATA is generally a point-to-point implementation. SATA is also limited because it is single duplex whereas SAS is a full duplex architecture.

Moreover, in operation, SAS may send input/output (I/O) data to SAS devices and is throttled by the target drive. For example, the initiator may send a task list to the target drive and the target drive may read or write data at its leisure. When SAS performs I/Os to SATA devices, a path between the initiator and the target is opened and held open for the length of the I/O. This is an inefficient use of the SAS bus, and holds off transactions to/from other targets.

In some current implementations, it is possible for a SATA device to operate in such a manner that its link will come up for a moment then be dropped. This causes a Serial Management Protocol (SMP) message to be sent through out the SAS domain, e.g., one for the link up then another for the link down. These messages inform the initiators on the domain that a change has taken place and that the initiators need to rescan the domain. The following rescan causes many more SMP messages or commands. This process may take a relatively long time and may consume valuable communication resources. If this process is continued in a SAS domain, little to no useful traffic propagation may be able to take place.

Accordingly, there is currently no good solution for the inefficiencies imposed by STP when SATA disk drives are coupled to SAS domains.

BRIEF DESCRIPTION OF THE DRAWINGS

The detailed description is provided with reference to the accompanying FIGUREs. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein (such as the embodiments discussed with reference to FIGS. 1-4) may enhance performance of SATA disk drives in SAS domains. In an embodiment, a converter logic may convert (also referred to herein interchangeably as translate) data packets and/or commands from a first serial format (such as SAS format) into second serial format (such as SATA), e.g., to enable a SATA disk drive to communicate with a host system through an SAS bus (for example, in accordance with a Serial SCSI Protocol (SSP)). In an embodiment, the converter logic may allow communication between SATA drives and SAS buses, without the need for using the less efficient SATA tunneling protocol (STP).

Figure 1:
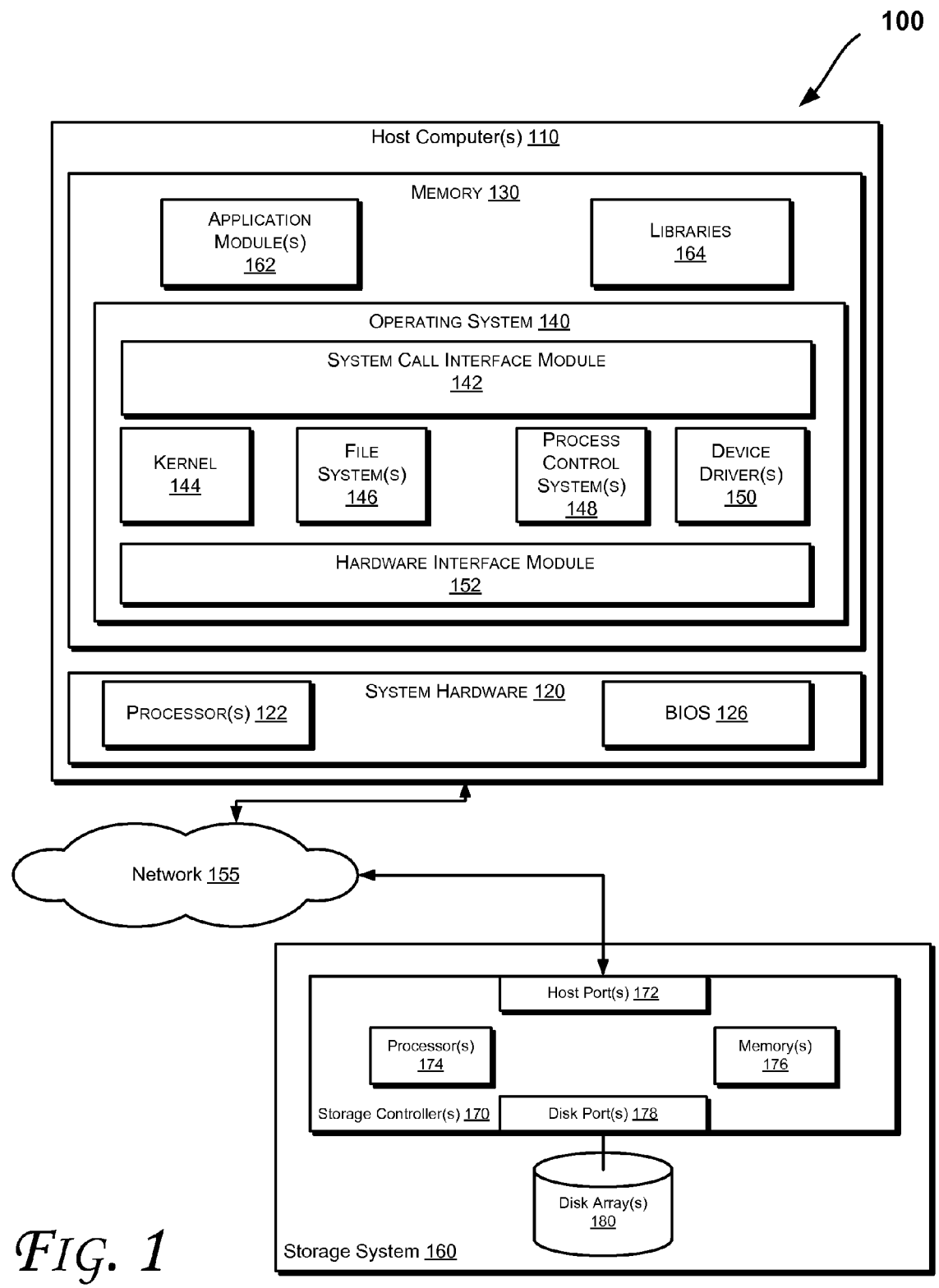
FIG. 1 is a schematic illustration of components of a storage system in accordance with some embodiments.

More particularly, FIG. 1 is a schematic illustration of components of a storage system 100 in accordance with some embodiments. The storage system 100 may include one or more host computers 110 coupled to one or more storage systems 160 via a communication network 155.

Host computer(s) 110 may include system hardware 120 commonly implemented on a motherboard and at least one auxiliary circuit board. System hardware 120 includes, among other things, one or more processors 122 and a basic input/output system (BIOS) 126. BIOS 126 may be implemented in flash memory and may comprise logic operations to boot the computer device and a power-on self-test (POST) module for performing system initialization and tests. In operation, when activation of computing system 100 begins, processor 122 accesses BIOS 126 and shadows the instructions of BIOS 126, such as power-on self-test module, into operating memory. Processor 122 then executes power-on self-test operations to implement POST processing.

Computer system 110 further includes memory 130, which may be implemented as random access memory (RAM), dynamic random access memory (DRAM), read-only memory (ROM), magnetic memory, optical memory, or combinations thereof. Memory 130 includes an operating system 140 for managing operations of computer 110. In one embodiment, operating system 140 includes a hardware interface module 154 that provides an interface to system hardware 120. In addition, operating system 140 includes a kernel 144, one or more file systems 146 that manage files used in the operation of computer 110 and a process control subsystem 148 that manages processes executing on computer 110.

Operating system 140 further includes one or more device drivers 150 and a system call interface module 142 that provides an interface between the operating system 140 and one or more application modules 162 and/or libraries 164. The various device drivers 150 interface with and generally control the hardware installed in the computing system 100.

In operation, one or more application modules 162 and/or libraries 164 executing on computer 108 make calls to the system call interface module 142 to execute one or more commands on the computer's processor. The system call interface module 142 invokes the services of the file systems 146 to manage the files required by the command(s) and the process control subsystem 148 to manage the process required by the command(s). The file system(s) 146 and the process control subsystem 148, in turn, invoke the services of the hardware interface module 154 to interface with the system hardware 120. The operating system kernel 144 may be generally considered as one or more software modules that are responsible for performing many operating system functions.

The particular embodiment of operating system 140 is not critical to the subject matter described herein. Operating system 140 may be embodied as a UNIX operating system or any derivative thereof (e.g., Linux, Solaris, etc.) or as a Windows® brand operating system. Computer system 110 may include one or more accompanying input/output devices such as, e.g., a display, a keyboard, and a mouse, and the like.

Storage system 160 generally comprises one or more storage controllers 170 coupled to one or more disk arrays 180, or other storage media. Storage controller 170 manages input/output (I/O) requests from host computer(s) 110 for storing and retrieving information on one or more disk arrays 180. Storage controller 170 may include one or more host ports 172 that couple to network 155 to provide a communication interface with host computer(s) 110. Host ports 172 may include appropriate logic for interfacing with attached host computer(s) 110 via appropriate protocols and media associated with communication network 155. In some embodiments, communication network 155 may utilize peripheral component interconnect (PCI), PCI-X, PCI express (PCIe), other parallel bus structures, and high speed serial interface communication paths (such as SAS) or the like to facilitate communication between the storage system 160 and the host computer 110.

Storage system controller 170 may also include one or more disk port(s) 178 which provide an interface for interacting with attached disk arrays 180. Disk ports 178 may operate according to Fibre Channel, parallel SCSI, other parallel bus structures, and other high speed serial communication media and protocols (such as SATA and/or SAS). Disk ports 178 therefore represent any of several commercially available interface elements for exchanging information with attached disk arrays 180.

Storage controller 170 may include one or more processors 174 to control operations of storage controller 170. For example, the processor(s) 174 may fetch and execute programmed instructions as well as associated variables from program memory 176. Memory 110 may be any suitable memory device for storing programmed instructions and/or associated data to be executed or manipulated by processor 174 including, for example, ROM, PROM, EPROM, flash memory, RAM, DRAM, SDRAM, etc.

In some embodiments, memory 176 may include cache memory, which may be utilized as a buffer for storing data supplied by a host computer 110 in an I/O write request. Data to be read from, and written to, disk arrays 180 may be staged in cache memory or buffer. A direct memory access (DMA) controller may effectuate transfers between elements of the controller 170.

Those of ordinary skill in the art will recognize a wide variety of equivalent structures to that of storage system 100 of FIG. 1 to provide features and aspects hereof. In particular, numerous additional functional elements may be recognized by those of ordinary skill in the art as desirable for implementing a fully featured storage system controller 170. Still further, additional integration of components will be readily apparent where, for example, DMA controller and processor may be integrated within a single microcontroller component. In addition, those of ordinary skill in the art will recognize that processor 174 may be any of a variety of general purpose or special purpose processors adapted for overall control of storage controller 170.

Figure 2:
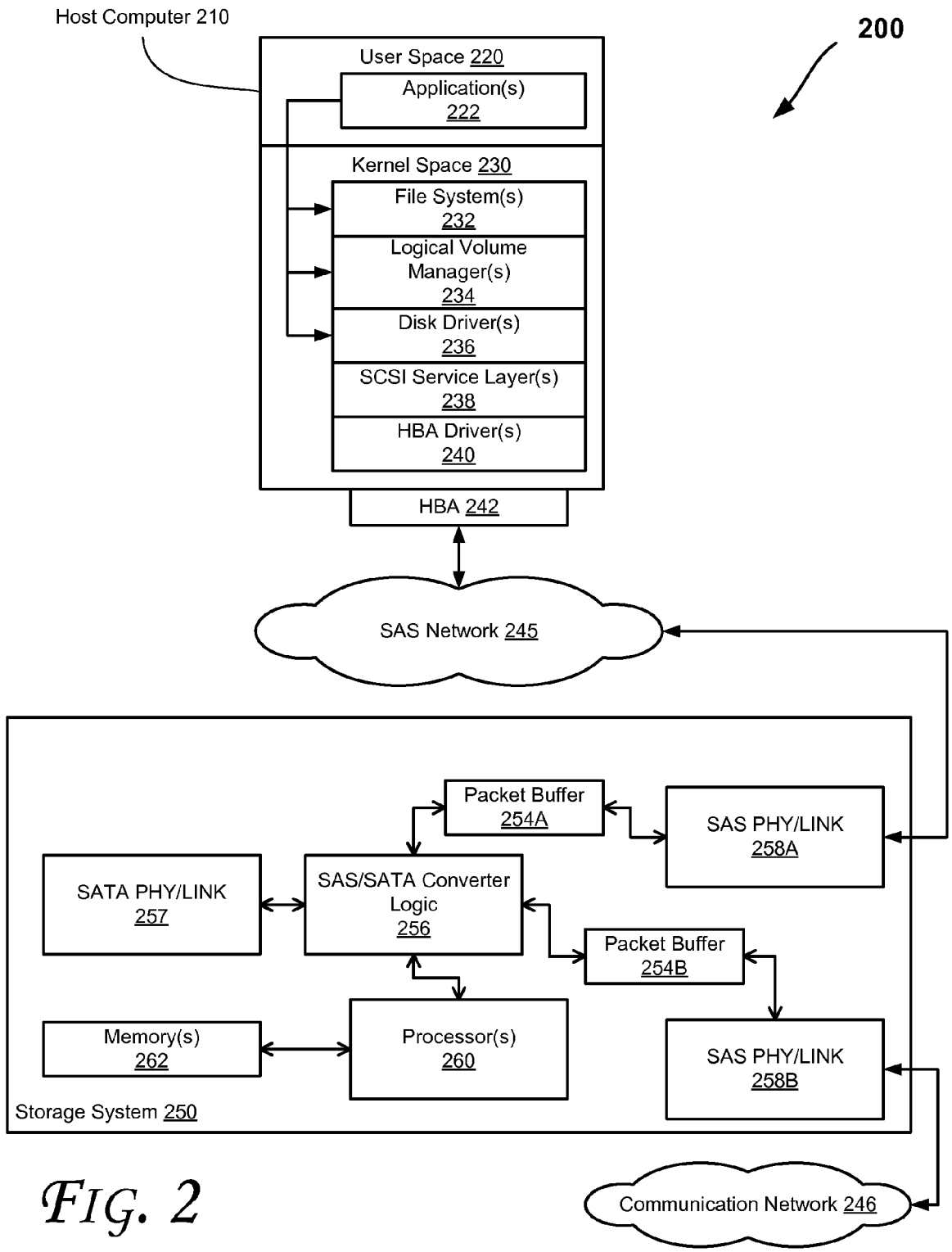
FIG. 2 is a schematic illustration of a logical view of a storage system in accordance with some embodiments.

FIG. 2 is a schematic illustration of a logical view of a storage system 200 in accordance with some embodiments. The host computer 210 depicted in FIG. 2 may correspond to the host computer 110 depicted in FIG. 1. Similarly, the storage system 250 depicted in FIG. 2 may correspond to storage system 160 depicted in FIG. 1.

As shown in FIG. 2, one or more applications 222 execute in the user space 220 of the operating system of host computer system 210. The kernel space 230 of host computer 210 comprises one or more file system(s) 232, logical volume manager(s) 234, disk driver(s) 236, SCSI services layer(s) 238, and host bus adapter driver(s) 240. A host bus adapter 242 couples the host computer 210 to communication network 246 (which may correspond to the network 155 of FIG. 1 in an embodiment), e.g., via SAS network or bus 245 and the storage system 250. In some embodiments, SAS network 245 may utilize other types of communication structures such as PCI, PCI-X, PCIe, other parallel bus structures, and high speed serial interface communication paths or the like to facilitate communication between the storage system 250 and the host computer 210.

As shown in FIG. 2, storage system 250 is coupled to SAS network 245 and communication network 246. The storage system 250 may include packet buffers 254A and 254B (which may store data corresponding to one or more transactions), SAS/SATA converter logic 256 (which may include one or more microcontrollers or processors in some embodiments), one or more SAS physical layer (PHY) or link logics 258A and 258B (which may be coupled to SAS initiators and expanders or SAS network), SATA PHY/link logic 257 (which may be coupled to a SATA disk drive), one or more processors 260, and/or one or more memories 262 (which may store data for processing by the processor(s) 260). The processors 260 and/or memory 262 may correspond to the processors 174 and/or memory(s) 176 of FIG. 1 in some embodiments. Moreover, the storage system 160 of FIG. 1 may include one or more of the components of the storage system 250 in some embodiments of the invention. Further operations of the storage system 250 will be further discussed herein with reference to FIGS. 3 and 4.

In some embodiments of the invention, the storage space implemented by disk arrays 180 of FIG. 1 may be aggregated into a storage pool of storage space. For example, a set of disk drives from the disk arrays 180 may form a shared storage pool for a number (n) of logical volumes. Further, a subset of drives in the disk arrays 180 may form a redundant array of inexpensive disks (RAID), e.g., with a specified RAID level. Also, in some embodiments, SATA drives may be used to implement massive storage the reliability of which may be kept in check by a RAID implementation.

In use, applications executing on host computer 210, or on one or more client computers coupled to host computer 210, may consume storage resources provided by storage system 250. For example, application I/O requests may be passed from an application 222 executing in the user space 220 of the operating system to the kernel I/O driver stack, and finally through the HBA (Host Bus Adapter) 242 and network 245 to the storage system 250.

Figure 3:
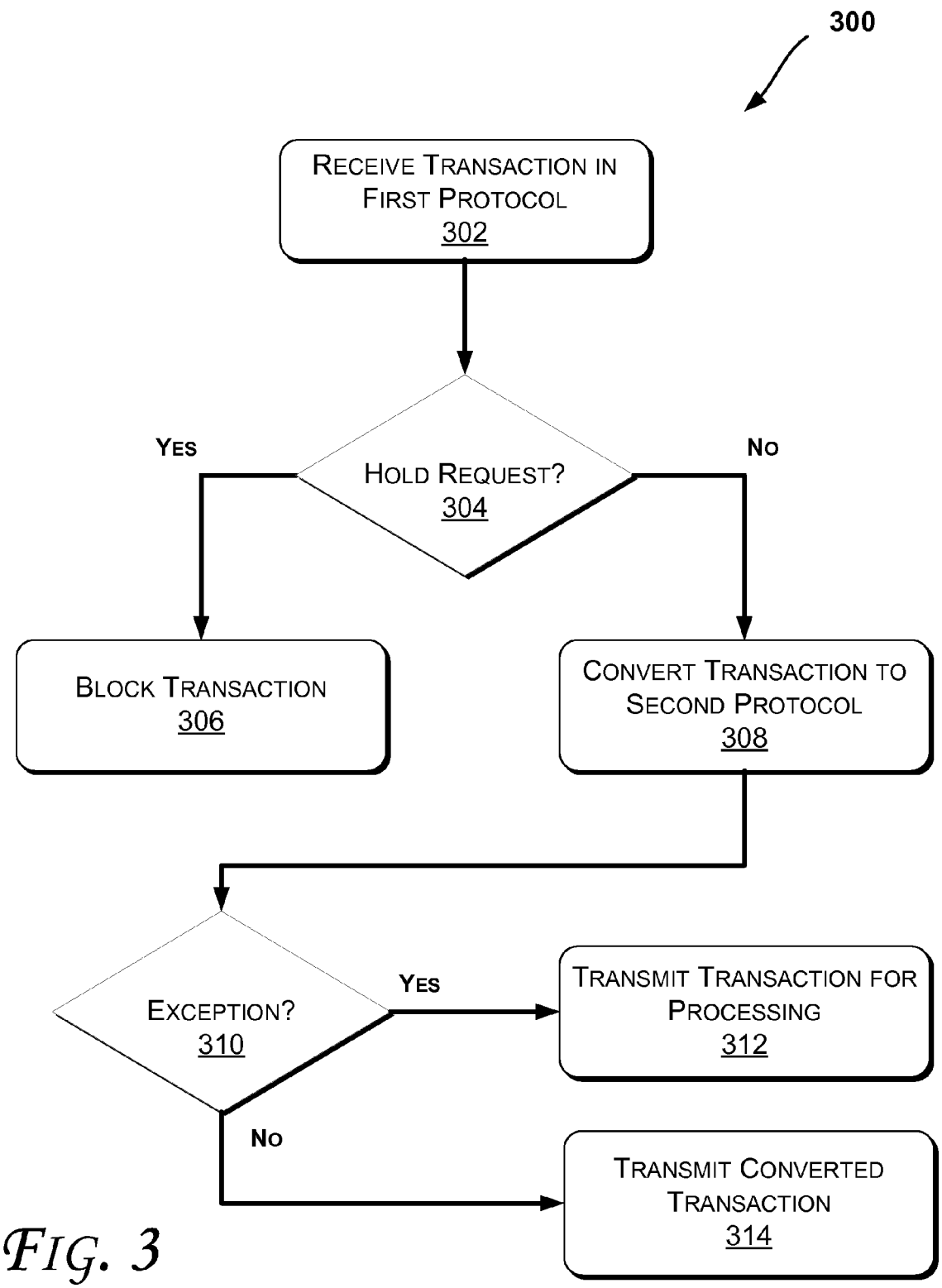
FIGS. 3 and 4 illustrate flow diagrams of methods according to some embodiments.

FIG. 3 illustrates a flow diagram of an embodiment of a method 300 to convert transactions between different serial communication protocols. In an embodiment, various components discussed with reference to FIGS. 1-2 may be utilized to perform one or more of the operations discussed with reference to FIG. 3.

Referring to FIGS. 1-3, at an operation 302, a transaction (e.g., including data packets and/or commands) may be received (e.g., stored in the memory(s) 262) in accordance with a first protocol (e.g., SAS). For example, the converter logic 256 may receive a transaction through the buffers 254A or 254B via the SAS network 245. Alternatively, the logic 256 may receive a transaction (e.g., a hold request) from a SATA drive, for example, through SATA PHY/link 257 at operation 302. At an operation 304, it may be determined whether the received transaction corresponds to a hold request (e.g., originating from a SATA drive). If the received transaction corresponds to hold request, the holds request may be blocked from being transmitted (e.g., to a corresponding SAS bus) at an operation 306. In an embodiment, an initiator may be informed to retransmit the transaction at a later time (or scan the corresponding SAS domain). For example, and SMTP message may be sent in one embodiment.

At an operation 308 (e.g., if it is determined that the received transaction does not correspond to a hold request), the received transaction may be converted from the first protocol into a second protocol. For example, the converter logic 256 may convert a SAS transaction into a SATA transaction at operation 308. At operation 310, it may be determined whether an exception has occurred during the conversion at operation 308. For example, an exception may occur if the converter logic 256 encounters an unexpected error or situation during processing. Once an exception occurs, the transaction may be transmitted for further processing (e.g., by the processor(s) 260) at operation 312. For example, the processor(s) 260 may send control signals to the logics 257 and/or 258A/258B. Furthermore, the processor(s) 260 may read and/or write data to registers within the converter logic 256 and/or the buffers 254A or 254B at operation 312. If no exceptions are detected at operation 310, the converted transaction is transmitted at operation 314 (e.g., a SATA transaction that is converted by the converter logic 256 is transmitted to the SATA PHY/link logic 257).

Figure 4:
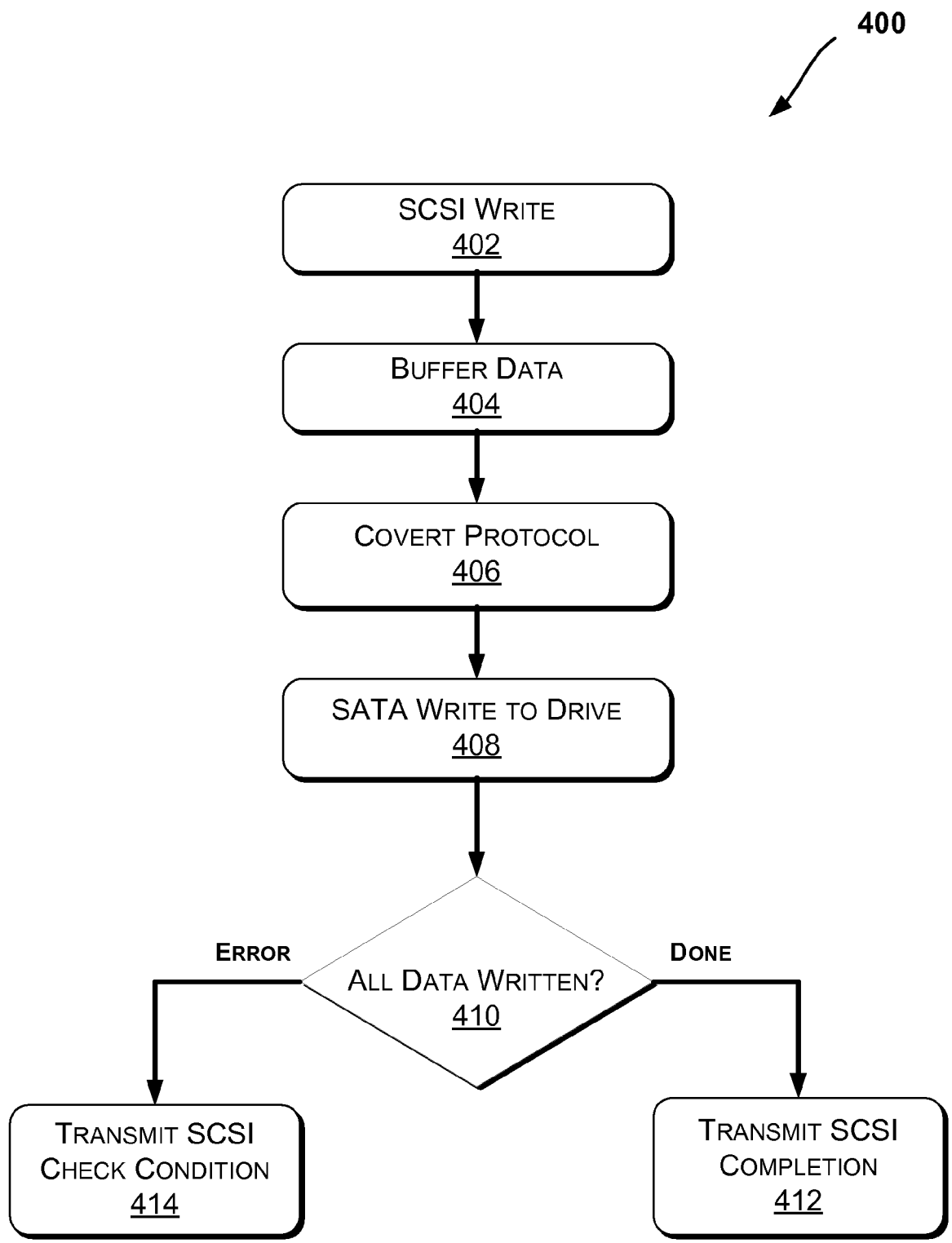

FIG. 4 illustrates a flow diagram of an embodiment of a method 400 to convert SCSI writes into SATA writes. In an embodiment, various components discussed with reference to FIGS. 1-3 may be utilized to perform one or more of the operations discussed with reference to FIG. 4.

Referring to FIGS. 1-4, at an operation 402, a SCSI write transaction may be received over an SAS bus (such as the SAS network 245), e.g., via an SSP connection. At an operation 404, the data received based on operation 402 may be buffered (e.g., in the buffers 254A or 254B). In an embodiment, after the data is buffered at operation 404, the SSP connection may be closed. At an operation 406, the command received at operation 402 may be converted to SATA (e.g., via hardware, software, and/or firmware). For example, the converter logic 256 may convert an SAS transaction into a SATA transaction at operation 406.

At operation 408, data corresponding to the transaction of operation 402 may be written to a SATA drive (such as discussed with reference to FIGS. 2 and 3, for example). At an operation 410, it may be determined whether all data is successfully written to the SATA drive. If data is written successfully, a SCSI completion transaction may be generated and transmitted at operation 412. Otherwise (e.g., upon an error), a SCSI check condition may be generated and transmitted at operation of 414. In some embodiments, the initiator of the SCSI write transaction of operation 402 may receive the SCSI messages of operations 412 and 414.

Accordingly, in an effort to shield the SAS domain from the deficiencies of the SATA interface and STP, some of the embodiments discussed herein may perform a protocol translation (also referred to herein interchangeably as conversion), e.g., at the drive.

In an embodiment, an expander translator may be utilized. More particularly, SAS expanders are becoming more intelligent with every product introduction. These devices may utilize their on-board processor (e.g., an ARM processor) to perform the translation discussed here. Alternatively, the PHY/link in each expander port may perform the translation (e.g., performed by the converter logic 256) for the attached disk drive. This may require dedicated logic to perform the command mapping and data buffering requirements. Another embodiment may involve the expander associating two different SAS addresses (e.g., separate data paths) to each attached SATA drive. This would give the overall system the appearance of a dual-ported SAS drive. One of the main benefits of this solution is low cost with enhanced performance.

In yet another embodiment, a tailgate solution may be used which involves utilization of two physical SAS ports and a SATA host port (e.g., such as shown in FIG. 2). Further, a processor and some memory (which may be external or on-board in various embodiments) may be used. The process may handle most configuration and transaction setup operations with a hardware logic block taking care of most of the data mover functions. One of the benefits of this solution may be a wide market and native support of physical path redundancy.

In some embodiments, the converter logic may enhance performance, for example, by shielding the SAS domain or preventing the SAS domain from having to deal with STP traffic. This would increase performance of the domain. The logic may also shield the SAS domain from the physical connection of a SATA device. This means when a SATA drive fails, it may be handled in an intelligent manner by the device. Further, this may prevent the possibility of a drive (which may have its link going up and down) from saturating the SAS domain with broadcast messages which may halt all or a portion of useful traffic on the SAS domain.

Also, as SAS domains grow, the requirement for their reliability may also increase. Some of the embodiments discussed herein may help to prevent the unreliable and inefficient nature of SATA from hurting an SAS domain (e.g., with the advantage of only needing to purchase one device for each SATA position in the SAS domain). This means that even if a relatively cheap SATA drive dies, the converter logic may not need to be replaced (only the inexpensive drive may need to be replaced).

In various embodiments of the invention, the operations discussed herein, e.g., with reference to FIGS. 1-4, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-4.

Additionally, such computer-readable media may be downloaded as a computer program product, wherein the program may be transferred from a remote computer (e.g., a server) to a requesting computer (e.g., a client) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
   a memory to store data corresponding to one or more transactions that are transmitted in accordance with a first serial communication protocol;
   a first logic, comprising a first processor, to convert the stored data from the first serial communication protocol into a second serial communication protocol;
   a second logic coupled to the first logic to receive and transmit the converted data to a serially attached drive; and
   a second processor, coupled to the first logic, to handle exceptions generated by the first logic, wherein the first logic blocks a hold request initiated by the serially attached drive from being communicated to a serial bus that communicates data in accordance with the first serial communication protocol and wherein the serially attached drive is to retransmit a transaction, corresponding to the hold request, at a later time.

2. The apparatus of claim 1, wherein the stored data comprises information corresponding to one or more of data packets or commands.

3. The apparatus of claim 1, wherein the first serial communication protocol comprises Serial-Attached Small Computer System Interface (SAS) protocol.

4. The apparatus of claim 1, wherein the second serial communication protocol comprises Serial Advanced Technology Attachment (SATA) protocol.

5. The apparatus of claim 1, wherein the serially attached drive comprises a Serial Advanced Technology Attachment (SATA) disk drive.

6. A method comprising:
   receiving one or more transactions in accordance with a first serial communication protocol;
   converting the transactions from the first serial communication protocol into a second serial communication protocol at a first processor;
   transmitting the converted transactions to a serially attached drive;
   handling exceptions generated by the first processor at a second processor;
   blocking a hold request initiated by the serially attached drive from being communicated to a serial bus that communicates data in accordance with the first serial communication protocol; and
   the serially attached drive, retransmitting a transaction, corresponding to the hold request, at a later time.

7. The method of claim 6, further comprising storing data corresponding to the one or more transactions in a buffer.

8. The method of claim 6, further comprising storing information corresponding to one or more of data packets or commands in a buffer.

9. The method of claim 6, wherein receiving the one or more transactions in accordance with the first serial communication protocol comprises receiving the one or more transactions in accordance with a Serial-Attached Small Computer System Interface (SAS) protocol.

10. The method of claim 6, wherein converting the transactions from the first serial communication protocol into a second serial communication protocol comprises converting the one or more transactions into a Serial Advanced Technology Attachment (SATA) protocol.

11. The method of claim 6, wherein transmitting the converted transactions to the serially attached drive comprises transmitting the converted transactions to a Serial Advanced Technology Attachment (SATA) disk drive.

12. The method of claim 6, further comprising handling, at the second processor, exceptions generated in response to the converting.

13. A computer-readable medium comprising one or more stored instructions that when executed cause a computing device to:
   receive one or more transactions in accordance with a first serial communication protocol;
   convert the transactions from the first serial communication protocol into a second serial communication protocol at a first processor;
   transmit the converted transactions to a serially attached drive;
   handle exceptions generated by the first processor at a second processor;
   cause the computing device to block a hold request initiated by the serially attached drive from being communicated to a serial bus that communicates data in accordance with the first serial communication protocol; and
   cause the serially attached drive to retransmit a transaction, corresponding to the hold request, at a later time.

14. The computer-readable medium of claim 13, further comprising one or more stored instructions that cause the computing device to cause storage of data corresponding to the one or more transactions in a buffer.

* * * * *